Oct. 17, 1933.　　　M. M. CUNNINGHAM　　　1,930,708
BRAKE DRUM SEAL
Filed Dec. 21, 1931

INVENTOR.
MARION M. CUNNINGHAM
BY
ATTORNEY

Patented Oct. 17, 1933

1,930,708

UNITED STATES PATENT OFFICE 1,930,708

BRAKE DRUM SEAL

Marion Morgan Cunningham, South Bend, Ind., assignor to Bendix Aviation Corporation, South Bend, Ind., a corporation of Delaware Application December 21, 1931
Serial No. 582,453

9 Claims. (Cl. 188—218)

This invention relates to brakes, and more particularly to shields for the friction elements therefor.

Broadly, the invention comprehends a dust shield for the frictionally engaged elements of an internal expanding brake. In the illustrative embodiment a fixed support or backing plate has associated therewith a rotatable drum. The support has an annular channel in which is housed a circumferential flange formed on the drum and in the housing is positioned a flexible washer designed to effectively seal the opening between the backing plate and the drum, so that foreign substance, such as dust and road splash, may be excluded.

The gist of the invention is to be found in the flexible washer forming the sealing member between the fixed support and the drum. The structure provides for free rotation of the drum without excessive friction due to the presence of the washer, and in addition thereto the washer is designed to take care of the varying clearance between the backing plate and the drum due to uneven rotation of the drum caused by defective bearings for the wheel supporting the drum or other causes.

An object of the invention is to provide means for effectively sealing the space between a fixed support and a rotatable drum, affording free rotation of the drum with the minimum amount of friction caused by the sealing member.

Another object of the invention is to provide means arranged intermediate a fixed member and a rotatable member having a substantial bearing on the fixed member and line engagement with the rotatable member.

Yet a further object of the invention is to provide a flexible member arranged between a fixed member and a rotatable member arranged to effectively seal the space between the fixed member and the rotatable member against foreign substances.

A feature of the invention is a ring, a superimposed ring having a smaller diameter, and a member interposed between the rings tending to spread them apart.

Another feature of the invention is a flexible ring, a superimposed flexible ring having a smaller diameter, a member positioned between the rings and means for securing the rings together.

Another feature of the invention is a ring stamped or cut from synthetic leather, a superimposed ring of the same material having a smaller over-all diameter, a member interposed between the rings and means for securing the rings and member together.

A further feature of the invention is a ring stamped or cut from a suitable flexible material, a superimposed ring of relatively thin metal having spaced openings and a flange and a ring of smaller diameter vulcanized to the other flexible ring through the openings in the metallic ring.

Still a further feature of the invention is a ring of flexible material folded upon itself circumferentially to provide in effect two rings, one of which has a greater overall diameter than the other, and a member interposed between the rings.

Yet a further feature of the invention is a ring folded upon itself circumferentially to provide in effect two rings, one of which has a greater over-all diameter than the other, a wire positioned between the rings and heat resisting rubber securing the rings to each other.

Other objects and features of the invention will appear from the following description taken in connection with the drawing forming a part of this specification, and in which.

Figure 1:
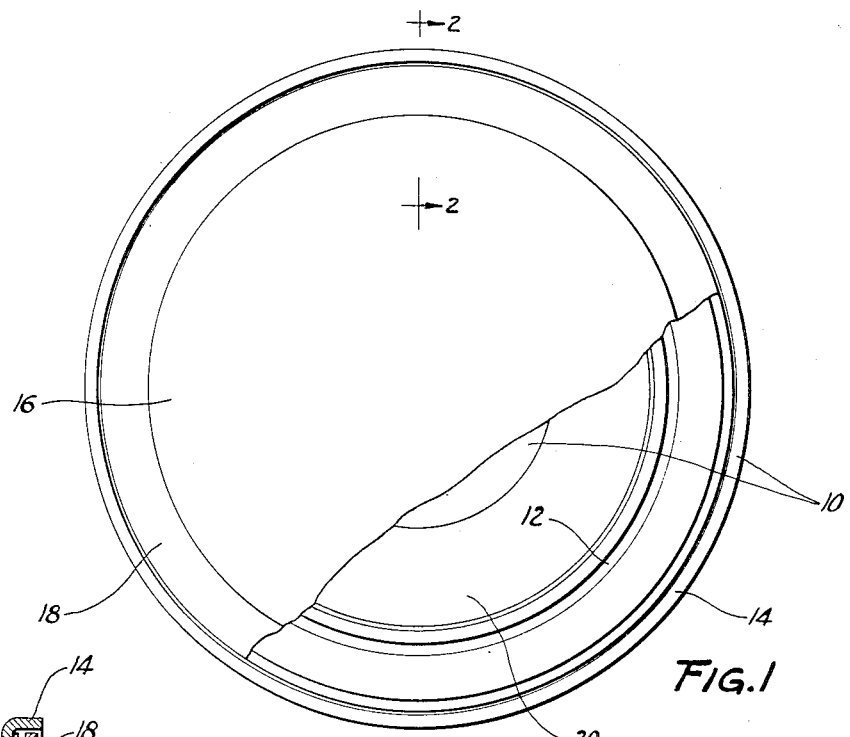
Figure 1 is an elevation of an assembly of a backing plate and a drum, the drum being partly broken away to better illustrate the invention.
Figure 2:
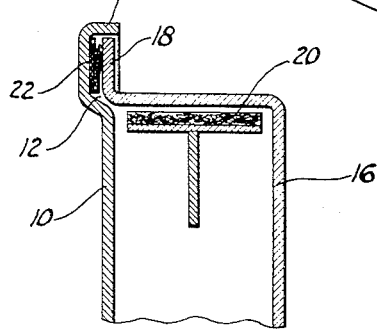
Figure 2 is an enlarged sectional view substantially on the line 2—2, Figure 1.

Referring to the drawing for more specific details of the invention, 10 represents a fixed support or backing plate. As shown, the backing plate has an annular channel 12 and a peripheral flange 14. Associated with the backing plate is a rotatable drum 16 having a flange 18 housed in the channel. A friction element 20 is positioned on the backing plate for cooperation with the drum. This element is operable through a suitable means, not shown.

Positioned in the annular channel 12 is a sealing member 22 comprising a ring 24 of flexible material such as synthetic leather. If desired this ring may be cemented in the channel. The ring 24 is flapped against the bottom of the annular channel 12 and super-imposed on the ring 24 is a ring 26 having a smaller over-all diameter. The rings 24 and 26 are suitably secured together and a spreading member 28 is interposed.

In practice it has been found desirable to either stitch the rings 24 and 26 together as indicated at 30 or to vulcanize the rings one to the other with the spreading member 28 interposed. The ring 26 engages the flange 18 on the drum 16 by line contact and subsequently friction due to the sealing member 22 is reduced to a minimum.

Figures 3, 4:
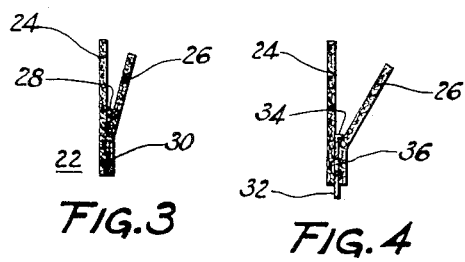
Figure 3 is an enlarged detail view of the sealing member.
Figure 4 is a modification illustrating a different form of the sealing member.
Figure 5:
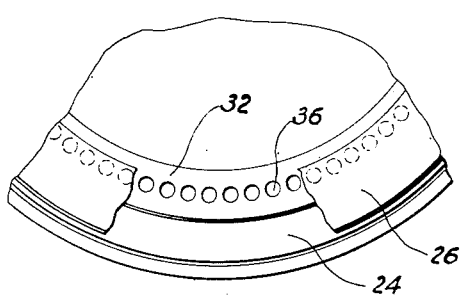
Figure 5 is a side elevation further illustrating the form shown in Figure 4.

A modification of the invention is illustrated in Figures 4 and 5. In this modification there is provided a ring 24 and a super-imposed ring 26 having a smaller over-all diameter. Interposed between the rings is a flexible metallic ring 32 having a flange 34 and a plurality of spaced openings 36. The rings 24 and 26 are vulcanized to each other through the openings 36 in the metallic ring 32 and the flange 34 on the ring 32 serves to spread the rings 24 and 26 apart to effectively engage the ring 26 with the flange 18 with the drum by line contact.

Figures 6, 7:
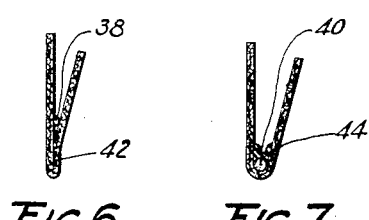
Figure 6 is a further modification of the sealing member.
Figure 7 is still a further modification of the sealing member.

A further modification of the invention is illustrated in Figures 6 and 7 wherein a single strip or ring of a flexible material is folded upon itself to provide in effect two rings between which is positioned a spreader such as a cord 38 as shown in Figure 6 or a wire 40 shown in Figure 7. In the form shown in Figure 6 the cord and rings are vulcanized together as shown at 42 and in the form shown in Figure 7 the wire is embedded in heat resisting rubber as indicated at 44. In both of these forms the ring having the smallest over-all diameter engages the flange 18 on the drum 16 by line contact and effectively seals the space between the fixed support and the drum and yet means for taking care of the varying clearance between the fixed support and the drum due to defective bearings of wheel supporting the drum or other causes.

While the preferred embodiments of the invention have been described, it is to be understood that these are given merely as examples of the underlying principles of the invention, and since these may be incorporated in other specific mechanical structures, I do not intend to be limited to those shown except as such limitations are clearly imposed by the appended claims.

Having thus described the various features of the invention, what I claim as new and desire to secure by Letters Patent is:

1. A brake comprising a fixed support having an annular channel, a rotatable drum associated therewith having a flange positioned in the channel, and a flexible washer in the channel having line engagement with the drum.

2. A brake comprising a fixed support having an annular channel, a rotatable drum associated therewith having a flange housed in the channel, and a washer in the channel including a ring, a super-imposed ring, and a spreader between the rings.

3. A brake comprising a fixed support having an annular channel, a rotatable drum associated therewith having a flange housed in the channel, a washer of flexible material positioned in the channel, a super-imposed washer of flexible material having a smaller over-all diameter than the first washer, means for securing the washers together, and a spreader between the washers.

4. A brake comprising a fixed support having an annular channel, a rotatable drum associated therewith having a flange housed in the channel, a sealing member positioned in the channel including a flexible ring, a super-imposed flexible ring having a smaller over-all diameter, a spreader between the rings, and means for securing the rings together at their inner peripheries.

5. A brake comprising a fixed support having an annular channel, a rotatable drum associated therewith having a flange housed in the channel, a sealing member positioned in the channel including a flexible ring, a metallic ring having a plurality of openings arranged therein, and a super-imposed flexible ring vulcanized to the larger ring through the openings in the metallic ring.

6. A brake comprising a fixed support having an annular channel, a rotatable drum associated therewith having a flange housed in the channel, a sealing member positioned in the channel including a ring of flexible material bent upon itself circumferentially, and a spreader between the rings.

7. A brake comprising a fixed support having an annular channel, a rotatable drum associated therewith having a flange housed in the channel, a sealing member positioned in the channel including a ring bent upon itself circumferentially to form in effect two rings, a spreader positioned between the rings, and means for securing the spreader in position including heat resisting rubber.

8. An article of manufacture, a sealing member comprising a flexible washer, a super-imposed flexible washer having a smaller over-all diameter, and a spreader between the washers.

9. An article of manufacture, a sealing member comprising a flexible washer, a super-imposed flexible washer having a smaller over-all diameter, a spreader between the washers, and means for securing the washers together adjacent their inner peripheries.

MARION M. CUNNINGHAM.